United States Patent [19]

Young

[11] 4,330,077
[45] May 18, 1982

[54] METHOD OF SOLDERING RADIATOR TANKS

[75] Inventor: Fred M. Young, Racine, Wis.

[73] Assignee: Young Radiator Company, Racine, Wis.

[21] Appl. No.: 139,358

[22] Filed: Apr. 11, 1980

[51] Int. Cl.³ .............................................. B23K 31/00
[52] U.S. Cl. .................................... 228/139; 228/246; 228/255
[58] Field of Search ........ 228/189, 190, 139, 245–249, 228/251, 253, 255; 219/85 CA, 85 CM, 85 M, 85 R

[56] References Cited

U.S. PATENT DOCUMENTS 2,500,748  3/1950  Grant ............................. 228/249 X
2,512,426  6/1950  Hartley ............................... 228/140
2,585,997  2/1952  Bruewer ......................... 228/246 X

FOREIGN PATENT DOCUMENTS 883578 10/1971 Canada ............................... 228/249

OTHER PUBLICATIONS

"Brazing Contact Pins to Ceramic Substrates" by Martin, Jr. et al. IBM Technical Disclosure Bulletin vol. 14, No. 9, pp. 2594, Feb. 1972.

Primary Examiner—Gus T. Hampilos
Assistant Examiner—K. Y. Lin
Attorney, Agent, or Firm—Ira Milton Jones

[57] ABSTRACT

A leakproof soldered joint between overlying surfaces of two pieces of metal which are riveted together to bring areas of said surfaces into intimate contact with one another all around the holes through which the rivets pass, said joint being achieved by a method which, before the riveting operation, involves placement of thin washers of solder between said pieces of metal in register with aligning rivet holes therein, to establish a slight space between said pieces, and after the riveting operation, applying molten solder to all of the marginal edges of said overlying surfaces of the two pieces of metal so as to cause it to flow by capillary action between the entire areas of said overlying surfaces, and utilizing the heat of the molten solder to melt said washers and thereby cause molten solder therefrom to flow into any and all interstices between the rivets and the edges of the holes through which they pass.

2 Claims, 6 Drawing Figures

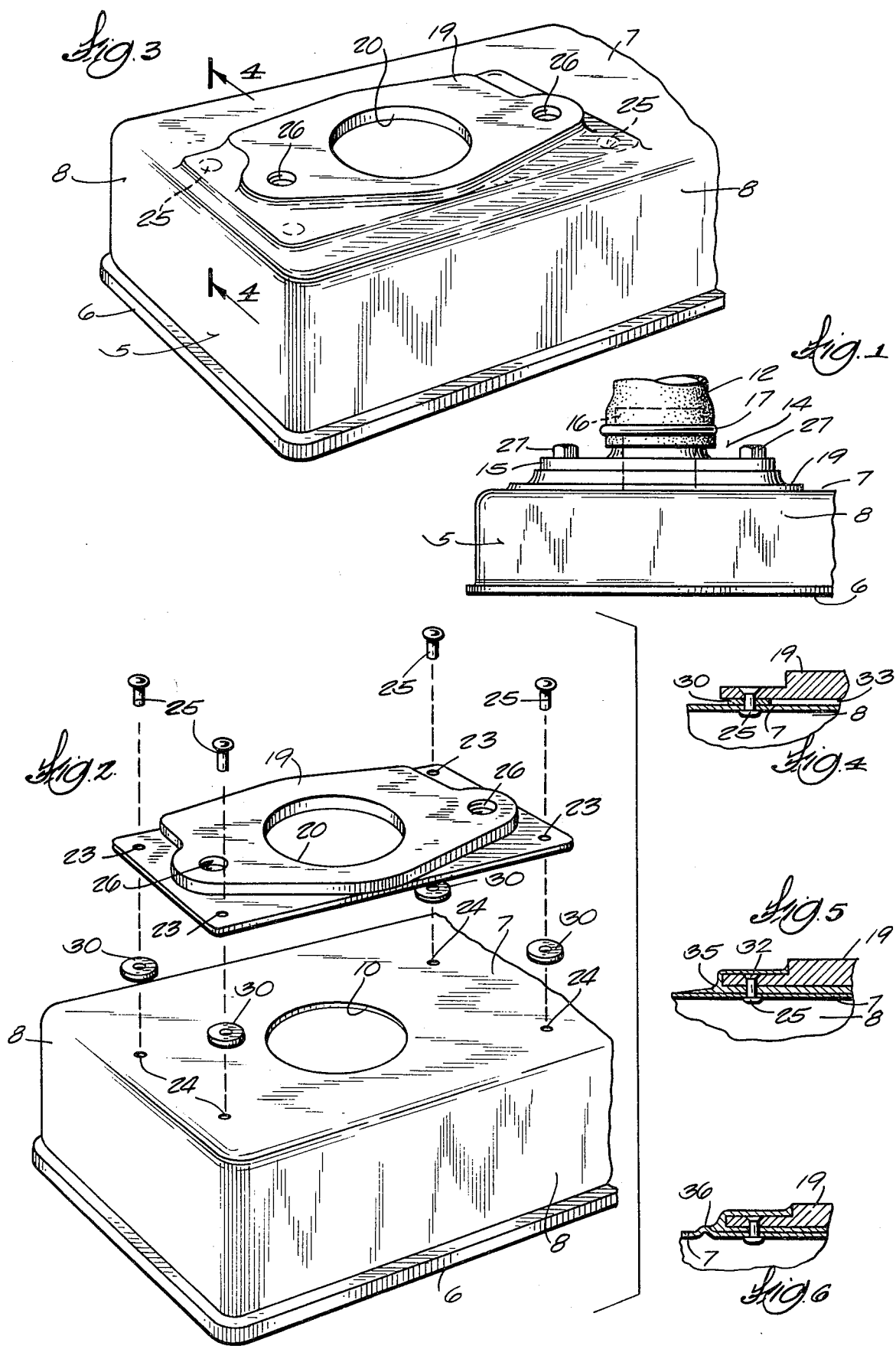

METHOD OF SOLDERING RADIATOR TANKS

This invention relates to the art of forming leakproof joints between two pieces of metal which are capable of being united by a bonding agent, such as solder, applied thereto in a molten state.

More particularly, this invention has reference to the manufacture of heat exchangers, namely radiators, of a type having a bottom tank or reservoir to which a hose is connectable for circulation of water to be cooled through the radiator.

Such a radiator tank ordinarily comprises a thin sheet metal stamping of brass or the like, having a hole in its flat bottom wall. The radiator hose is usually connected to an adapter similar to a pipe flange which, however, cannot be directly secured to the bottom wall of the tank without some reinforcement of said wall. Accordingly, the bottom wall of the tank is customarily reinforced at the area of the hose connection thereto, by a substantially flat centrally apertured plate formed of brass, iron, steel or the like. This plate is conventionally riveted to the bottom wall of the tank with its aperture in register with the hole in said wall, and after cleaning the surface with acid, molten solder is applied to the entire periphery of the plate to join the plate to the bottom of the tank.

The leakage resulting from the vibration to which such radiators are subjected to in use, has long plagued the industry. It has been determined that the underlying cause of such leakage stems from the essential step of riveting the reinforcing plate to the bottom wall of the tank. The riveting operation is commonly carried out by a pressing machine which, during upsetting of the rivets, brings the overlying surfaces of the reinforcing plate and the bottom wall of the tank into such tight and intimate flatwise engagement as to substantially block flow of molten solder along said surfaces during the soldering operation.

This is especially true of those areas of said overlying surfaces through which the rivets pass, despite lead or tin coating of that surface of the reinforcing plate which is to overlie the bottom wall of the tank. As a result, molten solder cannot flow to the riveted areas and into the rivet holes to fill the space around the exteriors of the rivets during the soldering operation, and leakage eventually occurs at the soldered joint between the plate and the bottom wall of the tank. As is to be explained, such leakage most commonly occurs through the rivet holes.

This invention has as its purpose the provision of a method of effecting a soldered joint between two metal parts, such as those described above, which assures an exceptionally strong union of said parts as well as the minimization or even complete elimination of leakage thereat.

More specifically, the method of this invention provides assurance that the tiniest interstices between the rivets and the holes through which they pass in securing two pieces of metal together, will be sealed closed by solder or the like during the application of molten solder to the peripheral portions of the reinforcing plate.

As will be brought out in greater detail hereinafter, such assurance is achieved through the confinement of thin pieces of solder between the mating surfaces of the two pieces of metal to be joined together by soldering, with said pieces of solder disposed closely adjacent to aligning rivet holes and before the insertion of rivets in said aligning holes. These pieces of solder can be in the nature of washers having holes substantially the same diameter as those of the rivet holes, and their purpose is to create and maintain a slight space between the mating or overlying surfaces of the two metal pieces during the subsequent riveting operation. This spacing apart of the overlying surfaces of the two metal pieces is essential to the method of this invention, as it enables molten solder thereafter applied to their marginal edges to flow by capillary action between all of said overlying surfaces, and utilizes the heat of said molten solder to melt the thin pieces of solder adjacent to the rivet holes so that it can thus flow into said holes and all around the rivets therein to seal them against the possibility of leakage thereat.

With these observations and objectives in mind, the manner in which the invention achieves its purpose will be appreciated from the following description and the accompanying drawing, which exemplifies the invention, it being understood that changes may be made in the precise method of practicing the invention and in the specific apparatus disclosed herein without departing from the essentials of the invention set forth in the appended claims.

The accompanying drawing illustrates one complete example of the embodiment of the invention constructed according to the best mode so far devised for the practical application of the principles thereof, and in which:

FIG. 1 is a fragmentary view, in elevation, of the bottom tank of a radiator, with the tank shown inverted and having a hose connected thereto;

FIG. 2 is an exploded perspective view of the tank and the reinforcing plate, shown before riveting of the plate to the bottom wall of the tank;

FIG. 3 is a perspective view of the tank shown after riveting and soldering of the reinforcing plate to its bottom wall;

FIG. 4 is a fragmentary sectional view taken on the plate of the line 4—4 in FIG. 3, but showing the relationship of the parts just prior to the soldering operation;

FIG. 5 is a view similar to FIG. 4 but showing the parts after soldering; and

FIG. 6 is a view similar to FIGS. 4 and 5, but illustrating a slight modification thereof.

Referring now to the accompanying drawing, and especially to FIG. 1, the numeral 5 generally designates the bottom tank or reservoir of a heat exchanger, or radiator, here shown inverted. The tank commonly comprises a thin sheet metal stamping, usually of brass, and in the form of a substantially shallow pan having an open top 6, a flat bottom wall 7 and upright side walls 8.

A hole 10 in the bottom wall 7 provides for the circulation of water through the radiator of which the tank is to form a part. A hose 12 is ordinarily provided for that purpose, and is connected to the bottom wall of the tank in communication with the hole 10 therein. The connection between the hose and the bottom wall of the tank is customarily effected by means of an adapter 14, in the nature of a pipe flange, having a central aperture in its flange 15 and a nipple 16 joined to the flange and projecting perpendicularly from one side thereof in alignment with its aperture.

The hose 12 is telescoped over the nipple, as seen in FIG. 1, and it is secured thereto by a hose clamp or wire connector such as designated by the numeral 17.

The connection between the hose and the bottom wall of the radiator tank also customarily comprises a plate 19, which is interposed between the bottom wall of the tank and the adapter 14. This plate can be in the nature of a casting of brass, iron or steel, having a central aperture 20. The purpose of the plate is to reinforce the area of the bottom wall 7 adjacent to the hole 10 therein, and hence at the location where the hose adapter is to be connected to the tank. Reinforcement of the tank at that location is essential, of course, due to the thin metal of the bottom wall thereof.

The reinforcing plate 19 and the bottom wall 7 of the tank have registering rivet holes 23 and 24 respectively therein to receive the rivets 25 by which the plate is secured flatwise to said bottom wall with its aperture in register with the hole 10 in the wall 7.

Substantially shallow tapped holes 26 in the plate at substantially opposite sides of its central aperture 20, provide for the reception of the screws 27 that hold the pipe flange in place on the plate. A gasket, not shown, is normally confined between the flange and the plate.

In the past, the adapter plate 19 has been riveted to the bottom wall 7 of the tank with the flat undersurface of the plate in direct intimate contact with the wall 7. The subsequent riveting operation, usually performed by a hydraulic press or the like, thus brought these flat surfaces of the plate and wall 7 in exceptionally tight engagement with one another during upsetting of the rivets.

Consequently, when a molten bonding agent such as solder or its equivalent, was applied to the marginal edges of the plate and the adjacent exterior surfaces of the bottom wall 7, it was impossible for the solder to flow very far by capillary action between the contacting surfaces of the wall 7 and its reinforcing plate, much less as far as the holes containing the rivets 25.

Thus, as mentioned hereinbefore, many radiators having bottom tanks made in accordance with the conventional method so far described were subject to leakage at the connection of the hose to its bottom tank, especially at those apertured areas containing the rivets 25. Accordingly, such radiators were obviously unsatisfactory because of their propensity for leakage; and, moreover, the tendency for such leakage was intensified by the failure of the conventional method of their manufacture to effect a secure enough bonded joint between all the overlying surfaces of the reinforcing plate and the bottom wall of the radiator.

The desired secure bonded joint between the bottom wall of the tank and its reinforcing plate is achieved by the method of this invention in a way that also results in the minimization or even the elimination of leakage at the riveted areas thereof.

In its broader aspects, the improved method entails the creation of a slight space between the bottom of the tank and its reinforcing plate before the riveting operation, of a size sufficient to allow a molten bonding agent (such as solder) to flow into said space by capillary action during the application of said molten bonding agent to the peripheral portions of the plate and the adjacent surfaces of the tank bottom. This assures complete bonding together of the overlying surfaces of the plate and the bottom wall of the tank.

In its more specific aspects, the improved method of this invention entails the establishment of the aforesaid space by means of thin pieces of metal having the same characteristics as the bonding agent applied to the marginal edge portions of the plate, and placement of said pieces of metal close enough to the edges of the aligning holes in the plate and tank wall as to assure flowing of the melt thereof into any and all interstices between the rivets in said holes and the adjacent edges of the latter after said pieces of bonding agent reach their melting point.

Also according to this invention, the heat of the molten bonding agent flowing by capillary action into the space between the bottom wall of the radiator tank and its reinforcing flange during the bonding operation, is utilized to melt the small pieces of metal adjacent to the rivet holes, without any additional application of heat to the reinforcing plate or tank.

It is important to note, however, that the thin pieces of bonding agent placed between the overlying surfaces of the plate and tank wall prior to riveting be either of such thickness or ductility as to assure the maintenance of the desired small space between said overlying surfaces during the riveting operation.

Specifically, the piece of metal placed between the aforesaid overlying surfaces can be in the nature of washers 30 of a suitable type of solder, having holes of a size substantially equal to those of the rivet holes, and in register with the rivet holes.

It is to be understood, of course, that the riveting and soldering operations are preceded by the customary pre-soldering steps of cleaning of the overlying surfaces of the tank and reinforcing plate by acid or the like, and that said surfaces may even be tinned to produce the strongest possible soldered joint therebetween.

As seen best in FIG. 5, the soldering operation of this invention preferably involves flowing of the molten solder over the countersunk rivet heads 32 and the adjacent upper surfaces of the reinforcing plate 19 at the time the solder is applied to the marginal edges of the plate. FIG. 4, of course, indicates the space 33 created between the plate 19 and the tank in somewhat exaggerated form, as the desired capillary action is achieved when the space created by the washers 30 is no greater than 1/64 of an inch.

The solder, seen at 35 in FIG. 5, can extend outwardly of the marginal edges of the plate and onto the adjacent surface of the tank; but it can be confined in a trough, if desired, by a bead 36 formed in the bottom wall of the tank and located in spaced opposing relation to the edge of the plate, as seen in FIG. 6.

From the foregoing description, together with the accompanying drawings, it will be apparent to those skilled in the art that this invention achieves the long sought leakproof joint between the bottom wall of a radiator tank and the reinforcing plate soldered thereto.

I claim:

1. In the method of uniting a reinforcing member to the bottom wall member of a radiator by a metallic bonding agent applied to said members while in a molten state, which method conventionally involves forming alignable rivet-receiving holes in said members at a number of spaced apart areas thereof, inserting rivets in aligning ones of said holes and upsetting the rivets with sufficient force to draw opposing surfaces of said members in contiguity, the improvement of said method which assures a mechanically strong leakproof joint between said members through practice of the following steps:

A. prior to the riveting operation, placing thin spacers of substantially the same metallic bonding agent between said members at locations closely adjacent to each of said rivet holes to thereby establish a slight uniform space between said members through which said molten bonding agent can readily flow by capillary action;

B. after each riveting, applying said molten bonding agent to the periphery of the reinforcing member to cause it to flow by capillary action over all of the overlying surfaces of said members and to thereby utilize the heat of such molten bonding agent to melt said spacers and thus cause the melt thereof to penetrate into all interstices between the rivets and the sides of the holes in which they are received.

2. The method of claim 1 wherein, prior to the riveting operation, a thin washer of said metallic bonding agent is placed between said members in register with each of said rivet holes so as to encircle the rivets thereafter inserted therein, so that the washers establish said uniform space between the members that assures flow of molten bonding agent over their entire overlying surfaces along with flow of the melt from said washers into the rivet holes to fill all interstices between their sides and the stems of the rivets therein.

* * * * *